July 10, 1951     W. R. TUCKER     2,560,142
FILTER
Filed March 13, 1946     3 Sheets-Sheet 1
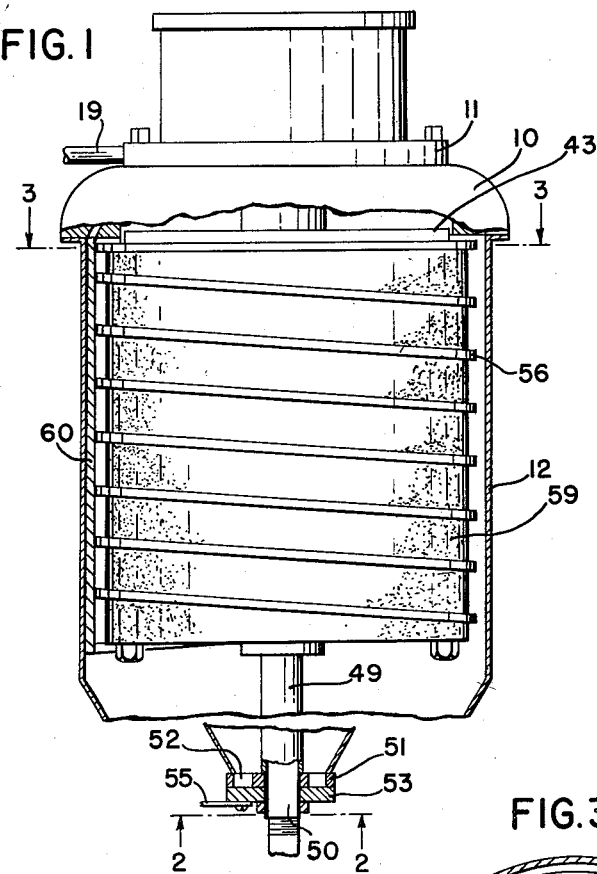
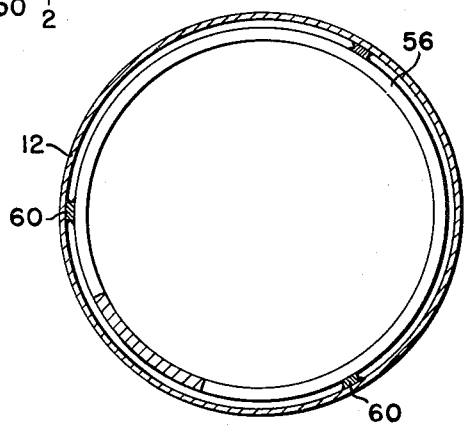
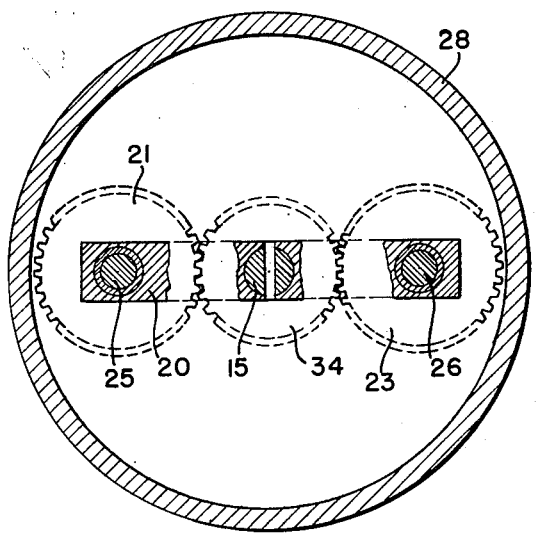
INVENTOR
WARREN R. TUCKER
BY
Toulmin & Toulmin
ATTORNEYS

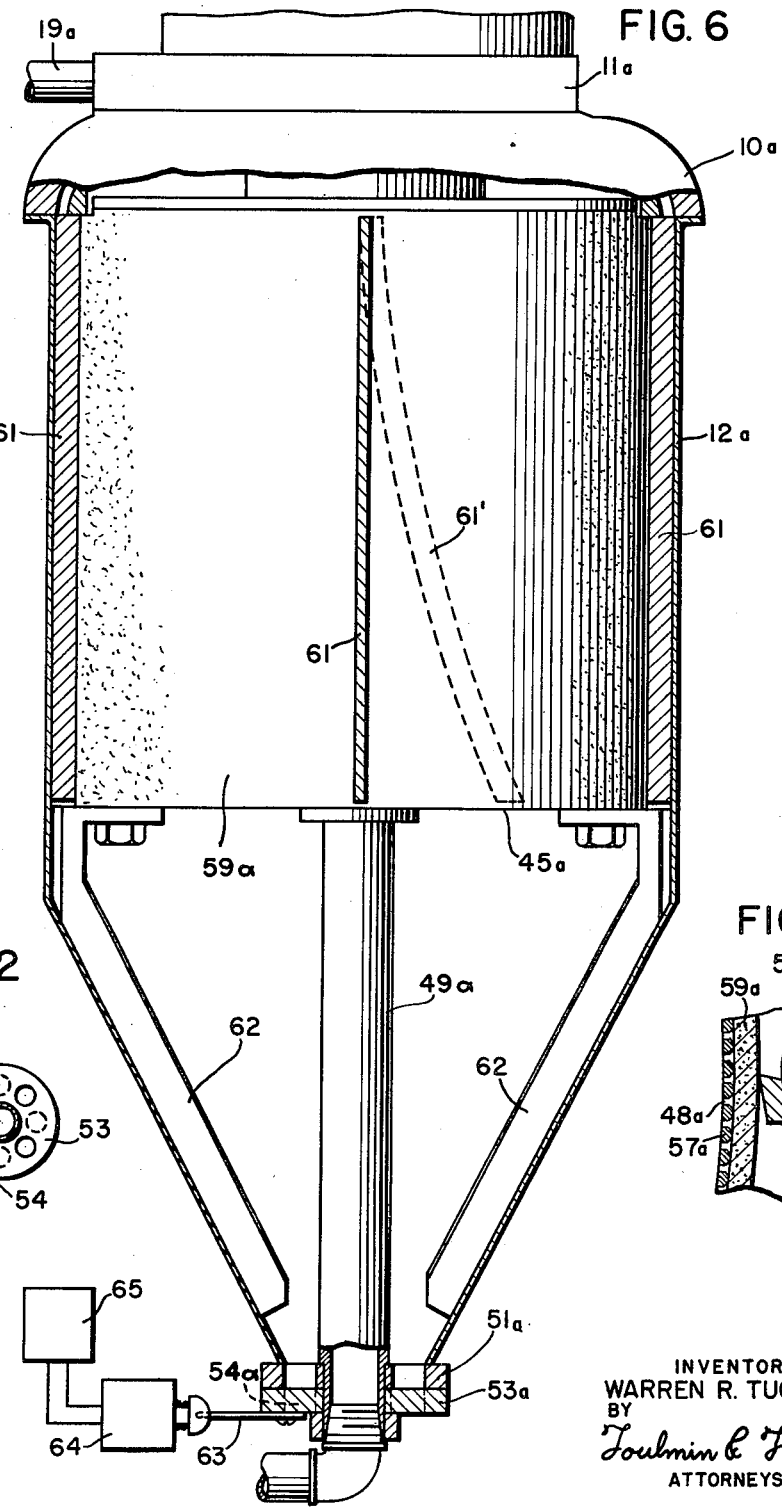

July 10, 1951  W. R. TUCKER  2,560,142
FILTER
Filed March 13, 1946  3 Sheets-Sheet 3

INVENTOR
WARREN R. TUCKER
BY
Toulmin & Toulmin
ATTORNEYS

Patented July 10, 1951

2,560,142

UNITED STATES PATENT OFFICE 2,560,142

FILTER

Warren R. Tucker, Dayton, Ohio, assignor, by mesne assignments, to The Commonwealth Engineering Company of Ohio, Dayton, Ohio, a corporation of Ohio Application March 13, 1946, Serial No. 653,975

4 Claims. (Cl. 210—152)

This invention relates to filters and, more particularly, to filtering devices with removable filtering material.

It is well known in the art to add so-called filter aid, a powder-like filtering material, to a liquid to be filtered, and thereupon to pass the mixture through a filtering cloth. The filter aid, which does not pass through the filtering cloth, will then settle down on the cloth and will act as filtering material for the oncoming liquid.

Devices of this type, while being very efficient as far as the filtering action itself is concerned, have the great disadvantage that they have to be stopped every fifteen to thirty minutes, in order to remove the filtering powder or cake deposited on the filtering cloth. This drawback is due to the fact that the quantity of filter aid deposited on the filtering cloth continuously increases as long as the filtering process lasts. Thus, the filter aid, in a rather short time, fills up the space between the filtering cloth and the container surrounding the cloth, thereby clogging up the passage for the liquid to be filtered.

On the other hand, the filtering action would materially be impaired, if only so much filter aid were initially added to the liquid to be filtered as is necessary to form a deposit of a predetermined thickness on the filtering cloth, while, from then on, the liquid to be filtered is passed through the filter without containing filter aid. The drawback of such a procedure consists in that a portion of the deposit or filter cake on the filtering cloth will peel off from the cloth during the filtering action during which the filtering cloth is being rotated. Under such circumstances, at least a portion of the liquid to be filtered would not pass through the filter aid deposit but only through the filtering cloth which latter has an insufficient filtering ability for the purpose involved.

It is, therefore, an object of the invention to provide a filter which will have the advantages of the devices heretofore used, without, however, presenting the drawbacks outlined above.

It is another object of the invention to provide a filter through which liquid containing filter aid may be passed in a continuous process without preventing the passage of liquid to be filtered through a deposit of filter aid in said filter.

It is a further object of the invention to present a filter using a deposit of filter aid deposited from the liquid to be filtered, in which the filter aid deposit is automatically limited to a predetermined thickness, while any portion of the filter aid deposit or cake which may peel off during the filtering action will be automatically replaced.

Another object of the invention consists in the provision of a filter using a filter cake deposited from the liquid passing through the filter, in which a scraping mechanism automatically scrapes off any cake deposit in excess of a predetermined amount required for the filtering action.

It is still another object of the invention to provide a filter as outlined in the preceding paragraph, in which the scraped off excess filtering deposit is automatically removed from the filter.

These and other objects and advantages of the invention will appear more clearly from the following specification in connection with the accompanying drawings in which:

Figure 1 illustrates, partially in section, a first embodiment of the invention.

Figure 2 is a section along the line 2—2 of Figure 1.

Figure 3 is a section along the line 3—3 of Figure 1.

Figure 5 is a section along the line 5—5 of Figure 4.

Figure 6 illustrates, partly in section, another embodiment of the invention.

Figure 7 is a section of a portion of the device illustrating a detail of the filter according to the invention.

General outline

Figure 4:
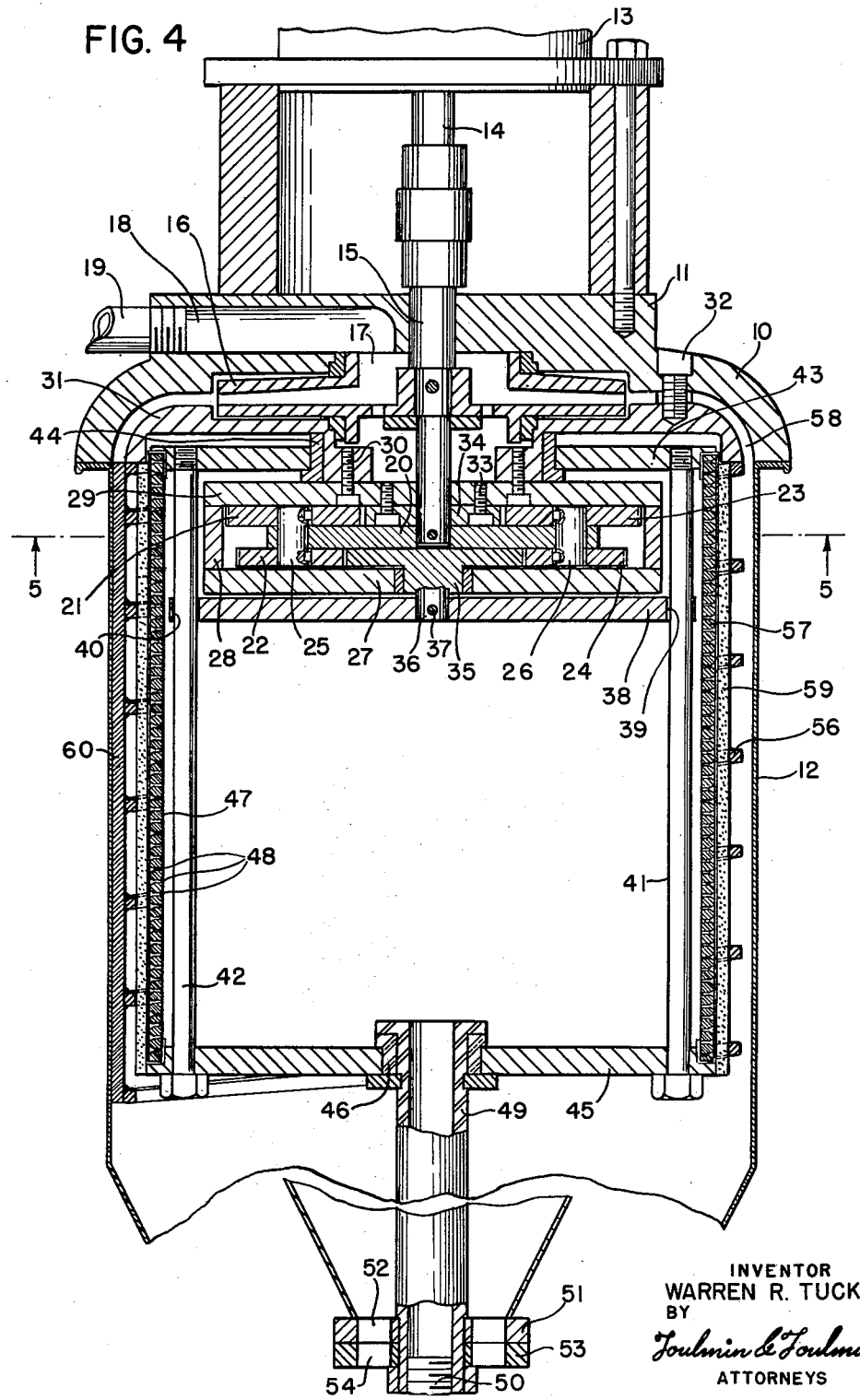
Figure 4 represents a longitudinal section through the filter illustrated in Figure 1, however, on a larger scale than that of Figure 1.

The filter according to the present invention consists primarily in a container housing a drum with a plurality of small apertures which are covered by a filtering cloth. Connected to the container and equidistantly spaced from the drum is a scraping device. The filter has associated therewith means for effecting a relative rotation between the drum and the scraping device. Liquid to be filtered is mixed with a so-called filter aid, a powder-like material having filtering qualities. This mixture is passed through the filter, while relative movement is effected between the drum and the scraping device. During this filtering action, filter aid is deposited from the mixture upon the filtering cloth until it reaches a predetermined thickness corresponding to the distance between the filtering cloth and the scraping device. Any excess of filter aid deposit beyond said predetermined thickness will be scraped off by the scrap-

Structural arrangement

Referring now to the drawings in detail, and Figures 1 to 4 in particular, the device shown therein comprises primarily a stationary body generally designated 10 which comprises a head 11 and a cylinder 12 tapering to the lower end thereof. The head 11 carries a motor 13 the shaft 14 of which is coupled to a shaft 15 of a pump 16. The pump 16 has a fluid inlet 17 connected by means of a passage 18 with a pipe 19, which latter receives the liquid to be filtered.

Also connected to the pump shaft 15 is a gear carrier 20 carrying four pinions 21, 22, 23 and 24. The pinions 21 and 22 are keyed to a pin 25, while the pinions 23 and 24 are keyed to a pin 26. The gears 21, 22, 23 and 24 are housed in a casing comprising a bottom portion 27, a side portion 28 and a top portion 29. The top portion 29 is connected by means of screws 30 to a lid shaped element 31 which in its turn is connected by screws 32 to the head 11. Also connected to the top portion 29 by means of screws 33 is a pinion 34 meshing with the pinions 1 and 23. A further pinion 35 passes through the bottom portion 27 and is connected through its stud 36 and pin 37 to a plate 38. The plate 38 has bores 39 and 40 therein through which rods 41 and 42 extend. The upper end of the rods 41 and 42 threadedly engages a plate 43 rotatably mounted upon a bearing 44. The lower end of the rods 41 and 42 engages a similar plate 45 rotatably mounted upon a bearing 46.

Connected to the plates 43 and 45 in any convenient manner is a cylinder 47 with small apertures 48. The interior of the cylinder 47 communicates through a pipe 49 with an outlet opening 50 adapted to receive tubing leading to a collecting tank. The lower end of the pipe 49 is surrounded by a plate 51 having discharge openings 52 therein. The discharge openings 52 are adapted selectively to be closed by a closure plate 53 or to communicate with openings 54 in said closure plate. The arrangement is such that relative movement between the pipe 49 on one hand and the plates 51 and 53 on the other hand is possible. Furthermore, the closure plate 53 may be moved relative to the plate 51 in any convenient manner by a link 55 (see Figure 2).

Connected to the lid-shaped element 31 in any convenient manner and substantially equidistantly arranged from the circumference of the cylinder 47 is a spiral-shaped scraping device 56. While according to Figure 4, the section of the spiral is square, the spiral may have any other section, for instance that disclosed in Figure 7.

The spiral is preferably welded to ribs 60 connected in any convenient manner with the cylinder 12. The filter also comprises a filtering cloth 57 surrounding the cylinder 47.

Operation

It may be assumed that the electric motor 13 has been energized so as to rotate the pump shaft 15. It may furthermore be assumed that the pipe 49 is connected to a collecting tank while the pipe 19 is connected with a supply tank containing the liquid to be filtered which has added thereto the so-called filter aid. Furthermore, the space between the filtering cloth 57 and the scraping device 56 is supposed to be empty. In other words, no filter aid deposit has been accumulated on the filtering cloth 57.

With the above assumptions, it will be clear that the liquid to be filtered passes through pipe 19 into the pump inlet opening 17 from where it passes through the pump 16 and is delivered through the annular channel 58 into the space between the cylinder 12 and the filtering cloth 57. The liquid will then pass through the filtering cloth where the filter aid will be deposited forming a cylindrical filter cake 59. This filter cake will act as a filter for the oncoming liquid. The filtered liquid then passes through the apertures 48 into the interior of the cylinder 47 and from there through pipe 49 into the collecting tank. During this filtering action, the gear carrier 20 is rotated by the pump shaft 15 so that the pinions 21 and 23 meshing with the stationary pinion 34 move around the latter and impart their rotative movement through the pinions 22 and 24 upon the pinion 35. It can be seen, by referring to Figure 4 of the drawing that movable pinion 35 is larger in size than stationary pinion 34. Since pinion 35, as previously mentioned is connected to the plate 38, also plate 38 will rotate and will by means of rods 41 and 42 and the plates 43 and 45 cause the cylinder 47 likewise to rotate at a reduced rate, of course, from that of the shafts 14 and 15.

As soon as the filter cake deposit has reached a predetermined thickness corresponding to the distance between the filtering cloth 57 and the spirals of the scraper 56, the filter cake deposit cannot increase in thickness any longer since any deposit it excess of the cake already deposited will be scraped off by the scraping device 56.

On the other hand, it will be obvious that if any filter cake deposit should peel off during the filtering operation new filter aid may be deposited on the respective portion of the filtering cloth from the oncoming liquid until the peeled off part of the cake has been completely replaced.

The peeled off or scraped off filter cake deposit will drop into the conical lower portion of the cylinder 12 from where it may be removed through the openings 52 as soon as the closure plate 53 is actuated so that its openings 54 register with the openings 52.

In this way, the filter according to the invention will allow a continuous filtering action without requiring stoppage of the filter for complete removal of the filter cake to allow passage of the liquid to be filtered through the filter.

Modification

Referring to Figure 6, illustrating a modified filter according to the invention, the main structure of this filter corresponds to the main structure of the filter described above in connection with Figures 1 to 5. Therefore, similar parts have been numbered with the same numerals as those applied to Figures 1 to 5, however, with the additional affix "a."

The main difference between the structure of Figure 6 and that of Figures 1 to 5 consists in that the spiral-shaped scraping device 56 has been replaced by scraper blades 61. These scraper blades as shown in Figure 6 are substantially parallel to the axis of rotation of the filtering cylinder. The section of the blade 61 may be square or may be of the shape shown in Figure 7. If desired, the blade 61 may be slightly inclined as indicated in dotted lines by the blade 61'. According to Figure 6 the bottom plate 45a of the filtering cylinder has connected thereto removal blades 62 which will stir the peeled off or scraped off cake from the cylinder and will convey the scraped off cake towards the plate 51a from where the excess filter aid or cake may be removed through the openings 54a into a collecting container. While the closure plate 53a may be operated manually, it is advantageous to operate said plate automatically. This may be done by connecting the handle 63, fastened to the closure plate 53a in any convenient manner, to a solenoid 64 which may be operated by a timer 65 in predetermined intervals depending on the setting of the timer.

The operation of the embodiment shown in Figure 6 will be the same as that described with regard to the structure of Figures 1 to 5, with the additional feature that the scraped off filter aid cake will be removed automatically.

It is of course understood that the present invention is by no means limited to the particular construction shown in the drawings, but also embraces any modifications within the scope of the appended claims.

Having thus fully described my invention what I claim as new and desire to secure by Letters Patent, is:

1. A filter unit comprising in combination a casing having a head member at its upper end, a drum within said casing and spaced therefrom, motor means supported by said head member and including a driving shaft extending into said casing through the head member, means including a plurality of gears in said drum for drivingly connecting said shaft to said drum for rotating said drum at a speed reduced from that of the shaft, scraper means stationarily arranged within said casing adjacent but spaced from said drum, rotary pump means in said head member and having its shaft in direct connection with said driving shaft on the opposite side of said gears from said drum, said pump means having its delivery side in direct continuous communication with the space between said casing and said drum whereby liquid to be filtered passes into said space, conduit means from the interior of said drum for the discharge of filtered fluid, said scraper means being operable to scrape off any filter deposit on said drum when the drum rotates in excess of a deposit of a predetermined thickness corresponding to the distance between said drum and said scraping means, discharge means for any scraped off filter material in the lowermost part of the casing, and means for selectively closing and opening the discharge means for discharging the filter deposit.

2. The combination of claim 1 in which the scraping means comprises a plurality of scraper blades rigidly connected to said casing and extending in a longitudinal direction of said drum substantially parallel to the axis of said drum.

3. The combination of claim 2 in which additional blades are provided in said casing for conveying the scraped off filter material to said discharge means.

4. The combination according to claim 1 in which the inlet of the pump means surrounds the driving shaft where the said shaft enters the casing.

WARREN R. TUCKER.

REFERENCES CITED

The following references are of record in the file of this patent:

UNITED STATES PATENTS

| Number | Name | Date |
| --- | --- | --- |
| 1,288,433 | McCaskell | Dec. 17, 1918 |
| 1,439,706 | Kneuper | Dec. 26, 1922 |
| 1,512,977 | Depue | Oct. 28, 1924 |
| 1,772,262 | Naugle | Aug. 15, 1930 |
| 1,822,006 | Bull | Sept. 8, 1931 |
| 2,009,382 | Blaufuss | July 30, 1935 |
| 2,053,856 | Weidenbacker | Sept. 8, 1936 |
| 2,076,611 | Barnebl | Apr. 13, 1937 |
| 2,087,708 | Trinkle | July 20, 1937 |
| 2,087,775 | Matthews | July 20, 1937 |
| 2,100,482 | Irwine | Nov. 30, 1937 |
| 2,308,716 | Re Qua | Jan. 19, 1943 |
| 2,439,463 | Gebauer | Apr. 13, 1948 |

FOREIGN PATENTS

| Number | Country | Date |
| --- | --- | --- |
| 188,362 | Great Britain | Nov. 7, 1922 |